(12) United States Patent
Liang et al.

(10) Patent No.: US 7,506,317 B2
(45) Date of Patent: Mar. 17, 2009

(54) METHOD FOR ENABLING COMPREHENSIVE PROFILING OF GARBAGE-COLLECTED MEMORY SYSTEMS

(75) Inventors: Sheng Liang, Cupertino, CA (US); Steffen Grarup, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 619 days.

(21) Appl. No.: 10/758,266

(22) Filed: Jan. 16, 2004

(65) Prior Publication Data

US 2004/0158589 A1    Aug. 12, 2004

Related U.S. Application Data

(62) Division of application No. 09/856,779, filed as application No. PCT/US99/28089 on Nov. 24, 1999, now Pat. No. 7,310,718.

(60) Provisional application No. 60/109,945, filed on Nov. 25, 1998.

(51) Int. Cl.
*G06F 9/44* (2006.01)
*G06F 13/00* (2006.01)
*G06F 9/455* (2006.01)

(52) U.S. Cl. ............................ 717/130; 711/170; 718/1

(58) Field of Classification Search ................ 717/128, 717/130; 711/170; 718/1
See application file for complete search history.

(56) References Cited

U.S. PATENT DOCUMENTS

| | | | | |
|---|---|---|---|---|
| 4,907,151 A | * | 3/1990 | Bartlett | 711/166 |
| 5,193,180 A | * | 3/1993 | Hastings | 717/163 |
| 5,621,912 A | | 4/1997 | Krol et al. | |
| 5,857,210 A | * | 1/1999 | Tremblay et al. | 707/206 |
| 5,991,856 A | * | 11/1999 | Spilo et al. | 711/147 |
| 6,047,125 A | * | 4/2000 | Agesen et al. | 717/148 |
| 6,058,457 A | * | 5/2000 | Tremblay et al. | 711/132 |
| 6,064,811 A | * | 5/2000 | Spilo et al. | 718/104 |
| 6,532,531 B1 | * | 3/2003 | O'Connor et al. | 712/202 |

FOREIGN PATENT DOCUMENTS

| | | |
|---|---|---|
| EP | 0777181 | 6/1997 |
| WO | WO 9848353 | 10/1998 |

OTHER PUBLICATIONS

Rosenberg, How Debuggers Work, 1996, Wiley Computer Publishing, pp. 180-182.*
Liang et al., Comprehensive Profiling Support in the Java Virtual Machine, May 1999, USENIX Association, 5th USENIX Conf. on Object-Oriented Technologies and Systems (COOTS '99), 12 pages.*

(Continued)

*Primary Examiner*—Tuan Q Dam
*Assistant Examiner*—James Rutten
(74) *Attorney, Agent, or Firm*—Sonnenschein Nath & Rosenthal LLP

(57) ABSTRACT

A method and apparatus for profiling a heap. According to the method, a flexible and comprehensive general-purpose profiling interface that uniformly accommodates a wide variety of memory allocation and garbage collection methods is used. The profiling interface, among other things, employs a set of virtual machine profiling interface events that support all known types of garbage collection methods.

16 Claims, 4 Drawing Sheets

OTHER PUBLICATIONS

Spencer, "JDK 1.2: Immature, but tons of new abilities", Jan. 1, 1998, JavaWorld, Inc. Accessed online on Jun. 21, 2007 at <http://www.javaworld.com/javaworld/jw-01-1998/jw-01-jdkroadmap.html>, 4 pages.*

"Java Virtual Machine Profiler Interface (JVMPI)", Nov. 11, 1998, accessed on Apr. 28, 2008 from <http://www.kbs.twi.tudelft.nl/Documentation/Programming/Java/jdk1.2/guide/jvmpi/jvmpi.html>.*

David L. Detlefs and Bill Kalsow, "Debugging Storage Management Problems in Garbage-Collected Environments" Jun. 26-29, 1994, In USENIX Conference on Object-Oriented Technologies Conference Proceedings, Monterey, CA.*

Peter van der Linden, Expert C Programming: Deep C Secrets, Jun. 14, 1994, Prentice Hall, 2 pages.*

A. Beguelin, et al., "Recent Enhancements to PVM," 3HE International Journal of Supercomputer Applications and High Performance Computing, US, MIT Press, vol. 9, No. 2, Jun. 1, 1995, pp. 108-127.

"Memory Allocation Monitoring Class," IBM Technical Disclosure Bulletin, US, IBM Corp., New York, vol. 37, No. 4A, Apr. 1, 1994, p. 445.

* cited by examiner

METHOD FOR ENABLING COMPREHENSIVE PROFILING OF GARBAGE-COLLECTED MEMORY SYSTEMS This is a divisional application of U.S. patent application Ser. No. 09/856,779, filed Oct. 3, 2001 now U.S. Pat. No. 7,310,718, which is the National Stage of International Application No. PCT/US99/28089, filed on Nov. 24, 1999 in the United States, which claims benefit of priority to U.S. Provisional Application No. 60/109,945, filed on Nov. 25, 1998, all of which are incorporated herein by reference.

FIELD OF THE INVENTION

The present invention relates to computer software, and more specifically to enabling comprehensive profiling of garbage-collected memory systems.

BACKGROUND OF THE INVENTION

Despite the rapid growth in memory sizes of computers, storage in which data is placed in a computer requires careful conservation and recycling. Some programming languages support static allocation of storage space while others support dynamic allocation. Static allocation connotes that storage space is determined at compilation of the computer program. In the case of dynamic allocation, storage space is determined during execution of the programs, known as "run-time". The area of dynamic memory reserved for storage space that is determined at run-time is a referred to as a "heap".

Many programming languages place the responsibility with the programmer to explicitly allocate storage and explicitly dispose or free that storage when it is no longer needed. Thus, when the programmer has the responsibility of the allocating and recycling or reclaiming of storage in dynamic memory, the memory management is said to be manually performed or "explicit".

An individually allocated piece of memory in the heap may be referred to herein as an "object". The goal is to dispose of unused or dead objects by freeing such objects and returning the space associated with such objects to the "free list" or "free pool". The "free list" or "free pool" is the set of unallocated usable spaces in the heap. However, with explicit allocation and deallocation, some objects cannot be deallocated or used because they have become "unreachable". The space occupied by an unreachable object is said to have "leaked" away. In addition, explicit deallocation may result in "dangling references". To illustrate, consider the following.

Data that is dynamically allocated in memory is usually accessible by the user program through the roots of the computation of the user program, or by following chains of pointers ("references") from these roots. The roots of the computation of a user program are those locations that hold values that a user program can manipulate directly. Processor registers and the program stack are examples of roots of the computation. Thus, an object in the heap is said to be "live" if its address is held in a root, or there is a reference to it held in another live object in the heap. Otherwise, the object is said to be "dead". An object becomes unreachable when the last reference to the object is destroyed before the object is deallocated. The object is no longer live if there are no references to it. In addition, such an object cannot be freed (deallocated) because it is unreachable, as there are no references leading to it. Objects that are neither live nor free cannot be used or recycled by explicit allocation and deallocation, and are called "garbage". Thus, unreachable dead objects are "garbage".

"Dangling references" occur when an object in the heap is deallocated while there are still references to the object. Dangling references can produce incorrect results. For example, if the memory location of the object that was deallocated while there were still references to it is reallocated to another of the user program's data structures, then the same memory location would represent two different objects.

Automatic dynamic memory management can obviate the problem of unreachable objects and dangling references. In one approach, automatic dynamic memory management involves assigning the responsibility for dynamic memory management to the program's run-time system. The programmer must still request dynamically allocated storage to be reserved but the programmer no longer needs to recycle the storage because the recycling is done automatically through a process called garbage collection. Garbage collection can recover unreachable objects by returning the space associated with such objects to the free list or free pool. In addition, garbage collection avoids dangling references by not deallocating any object while there remains references to it from other live objects.

Furthermore, garbage collection may be useful in correcting the problem of "fragmentation". Fragmentation occurs in the course of allocating objects of different sizes in the heap. There are various strategies for choosing the optimum space in the heap to allocate to an object. However, such strategies usually result in areas or "fragments" of free pool in the heap. Sometimes the fragments are too small to be useful and are not contiguous and therefore, cannot be combined. For example, FIG. 1 illustrates a heap 100. The shaded areas 102, 104, 106, 108, 110 indicate storage space already in use in heap 100. The non-shaded areas, 101, 103, 105 indicate fragments of free pool in heap 100. Assume that none of the fragments of free pool are large enough to meet the current request for allocation of an object. Even though the free pool is not empty, an object cannot be allocated in the heap if none of the fragments are large enough. Thus, garbage collection can be employed to reclaim storage space not just when the "free-pool" is empty but also to automatically perform compaction of the heap storage space that is in use.

Garbage collection is one of many features associated with profiling a given user program such as an application program. "Profiling" describes the monitoring and tracing of events that occur during run-time. For example, a profiling tool may provide information on how much or how frequently dynamic memory is allocated by each portion of the executing application program. As will be explained in greater detail, some of the dynamic memory allocation information can be extracted from the object allocation process and the garbage collection process.

In one approach, profiling tools are specifically customized and instrumented for a specific platform. Typically, tool vendors specialize in providing tools that are only suitable for certain platforms. For example, different virtual machine vendors provide myriad Java™ virtual machine implementations. Java™ is an object-oriented language, the source code files of which are compiled into a format called bytecode. Bytecode can be executed on any machine on which Java run-time system software is installed. The Java™ run-time system is known as a Java™ virtual machine, a self-contained operating environment that behaves as if it is a separate computer. The Java™ virtual machine translates the bytecode's set of instructions into the underlying computer processor's set of instructions. Thus, a Java™ application will execute in any Java™ virtual machine regardless of the hardware and software underlying the system. It would be highly desirable if users were given the choice of using any profiling tool that is available in the market without worrying if the tool is compatible with the user's particular implementation of Java™ virtual machine.

Based on the foregoing, it is desirable to develop a mechanism that supports a wide variety of profiling tools for garbage collected memory systems.

SUMMARY OF THE INVENTION

A method and system are provided for allowing a profiler to communicate with a virtual machine without regard to the specific implementation of the virtual machine. A wide variety of profilers can be accommodated by using a set of virtual machine profiler interface events that are designed to be independent of any method for dynamically managing storage allocation and deallocation in a heap within the virtual machine process. The profiler may request specific information with respect to storage allocation and or deallocation in the heap. In response, the virtual machine can send the requested information using the virtual machine profiler interface events.

In other aspects, the invention encompasses a computer apparatus, a computer-readable medium, and a carrier wave configured to carry out the foregoing techniques.

Many other aspects and features will become apparent from the following description.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Techniques for enabling comprehensive profiling of Java™ virtual machines are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Although certain embodiments have been described using the Java™ programming language, the present invention can be practiced on a variety of programming languages, and as such should not seen as limited to only the Java™ programming language.

FUNCTIONAL OVERVIEW

One embodiment of the invention is a general-purpose profiling interface between a virtual machine and the front-end of a profiler. The profiling interface is general enough to support a wide variety of profilers and virtual machine implementations. A general-purpose profiling interface offers at least two advantages over direct profiling support in the virtual machine implementation.

First, various profilers are not restricted to one format in presenting profiling information nor are they restricted in the types of profiling information they can present. For example, one profiler may simply record events that occur in the virtual machine trace file. Alternatively, another profiler may display information in response to interactive user input.

Another advantage of a general-purpose profiling interface is that a given profiler can be used with different virtual machine implementations, which support the same general-purpose profiling interface. This allows for profiling tool vendors and virtual machine vendors to leverage each other's products effectively.

Figure 1:
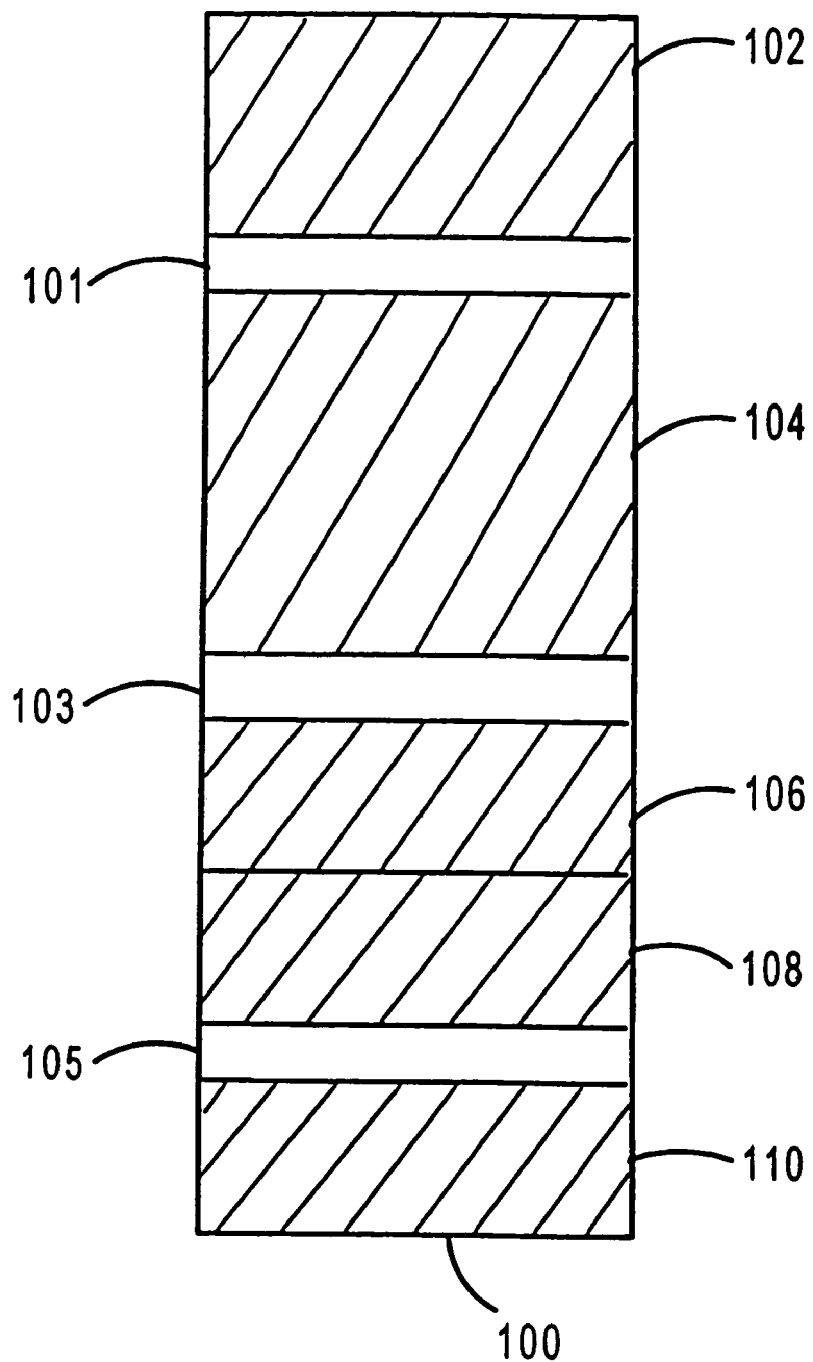
FIG. 1 is a block diagram illustrating fragmentation of a heap.
Figure 2:
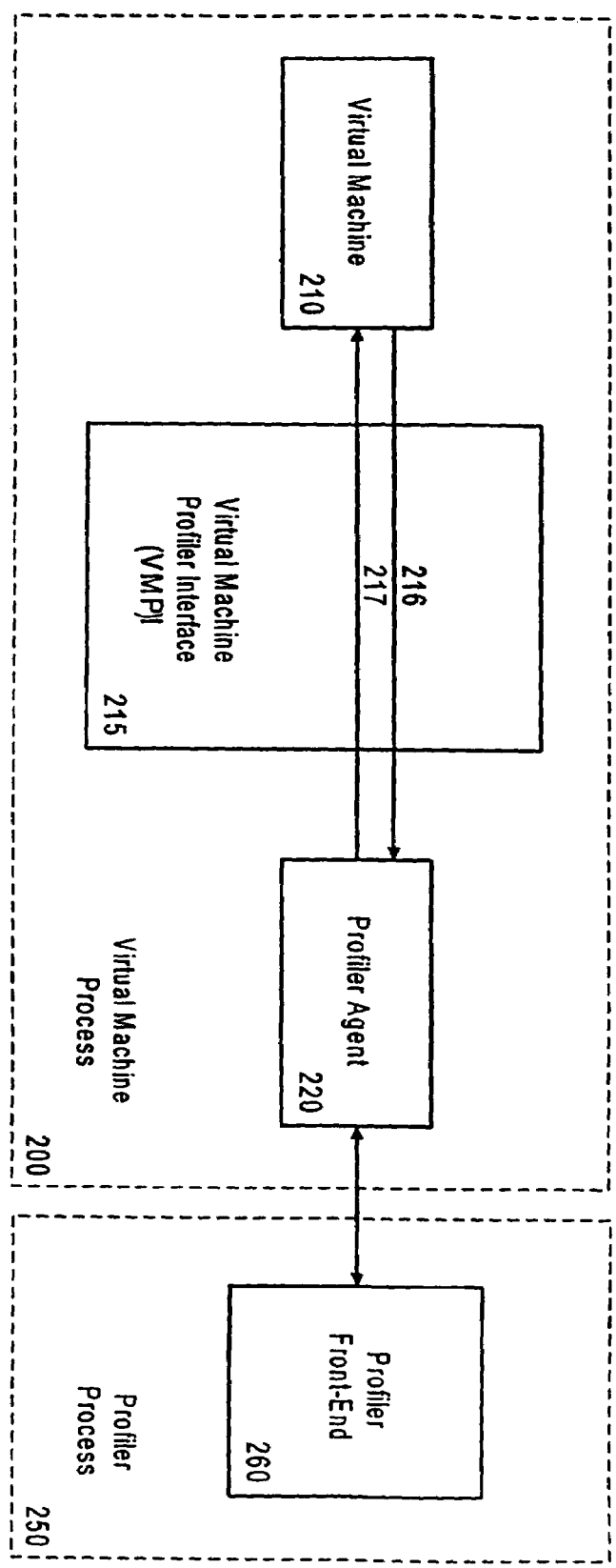
FIG. 2 is a block diagram illustrating a profiling architecture according to one embodiment of the invention.

FIG. 2 is a block diagram illustrating the overall profiler architecture according to one embodiment of the invention. The virtual machine profiler interface ("VMPI") 215 is interposed between the virtual machine 210 and the profiler agent 220. Typically, VMPI 215, virtual machine 210 and profiler agent 220 reside in a virtual machine process 200. Profiler agent 220 is responsible for communication between the VMPI 215 and a profiler front-end 260, which typically resides in a process that is separate from virtual machine process 200. In one embodiment of the invention, profiler front-end 260 resides in a profiler process 250, which is separate from virtual machine process 200 to ensure that the resources consumed by profiler front-end 260 are not attributed to the profiled user application. Specifications for an exemplary virtual machine profiler interface, "VMPI", for a Java™ virtual machine is attached hereto as Appendix A.

Profiler agent 220 can be programmed to delegate resource-intensive tasks to profiler front-end 260. Thus, even though profiler agent 220 runs on virtual machine process 200, profiler agent 220 does not overly distort the profiling information on the user application.

VMPI 215 is a two-way function call interface between virtual machine 210 and profiler agent 220. Typically, profiler agent 220 is implemented as a dynamically loaded library. Virtual machine 210 makes VMPI function calls to inform profiler agent 220 about various events that occur during the execution of the user application program as indicated by an arrow 216 of FIG. 2. Profiler agent 220 responds by calling back into virtual machine 210, as indicated by an arrow 217 of FIG. 2, for the purpose of accomplishing one or more tasks. For example, based on the needs of profiler front-end 260, profiler agent 220 may disable or enable certain types of events ("VMPI events") as they are sent through VMPI 215. The following is an example of how virtual machine 210 and profiler agent 220 may use VMPI function calls in one embodiment of the invention.

Profiler agent 220 may register the types of events in which it is interested by calling VMPI function:
jint (*EnableEvent)(jint event_type, void *arg)
Alternatively, Profiler agent 220 may call the following VMPI function to request a particular type of event:
jint (*RequestEvent)(jint event_type, void *arg)
In response, virtual machine 210 may send an event that was requested by profiler agent 220 by calling the following VMPI function:
void (*NotifyEvent) (JVMPI_Event *event)
VMPI function calls are explained in greater detail in Appendix A.

In one embodiment of the invention, VMPI events may be data structures consisting of an integer indicating the VMPI event type, an identifier of the thread in which the VMPI event occurred, followed by information that is specific to the VMPI event. Examples of some VMPI events are:

VMPI_Event_GC_Start

VMPI_Event_GC_Finish

As an illustration, virtual machine 210 sends the VMPI_Event_GC_Start event before the start of garbage collection, and when garbage collection is completed, virtual machine 210 sends the VMPI_Event_GC_Finish event. These and other VMPI events are explained in greater detail in Appendix A.

Allocation and Garbage Collection Events

In one embodiment of the invention, VMPI 215 is a flexible and yet comprehensive interface that uniformly accommodates a wide variety of memory allocation and garbage collection methods. Implicit in garbage collection methods are methods for memory allocation. Appendix A contains a detailed description of representative VMPI events. However, the focus is on the following set of profiling interface events that support all known types of garbage collection methods. Such profiling events are herein referred to as garbage collection algorithm-independent events since they support all known types of garbage collection methods and are further described in greater detail in Appendix A. These garbage collection algorithm-independent events may be used by virtual machine 210 to convey profiling information to profiler agent 220.

The abstract concept of a "heap arena" is used for describing allocation of new objects within the heap. A heap arena describes a logically partitioned portion of the heap. In one embodiment of the invention, all object allocations occur in a given heap arena even when there are a plurality of arenas. After the objects are allocated, they may be moved from one heap arena to another as explained below. To help explain the set of events, each event is described by its components. The first component is the event-type. The second component is the event-specific information contained in a pair of parentheses following the event-type.

new_arena (arena ID)

delete_arena (arena ID)

new_object (arena ID, object ID, class ID)

delete_object (arena ID)

move_object (old arena ID, old object ID, new arena ID, new object ID)

For example, "new_arena" is the event type and "arena ID" is the corresponding event-specific information. The virtual machine interface refers to entities in the virtual machine by various types of IDs. Threads, classes, methods, objects, heap arenas all have unique IDs. The subject of IDs is further detailed in Appendix A. In brief, each ID has a defining event and an undefining event. A defining event provides information related to the ID. For example, the defining event for an "object ID" contains, among other entries, the class ID of the object. The defining event for an object ID is "object allocate". The object ID remains valid until one of its undefining events arrive. The undefining events for an object ID are as follows:

The "object free" event, which invalidates an object ID.

The "object move" event, which signifies that the object still exists but its ID is changed, and or that it may have been moved to another heap arena.

The "arena delete" event, which invalidates all remaining object IDs in the heap arena.

When an object ID is invalidated either by an "object free" event or an "arena delete" event, the object is said to be "garbage collected".

Virtual machine 210 sends a "new arena" event to profiler agent 220 via VMPI 215 when a new heap arena for allocating objects is created. In one embodiment of the invention, the "new_arena" event may be described as follows in a Java™ virtual machine implementation.

```
Struct {
    jint arena_id;
    char *arena_name;
} new_arena;
```

The "arena_id" is the ID assigned to the new heap arena, and "arena_name" is the name of the new heap arena.

Similarly, virtual machine 210 sends a "delete_arena" event to profiler agent 220 through VMPI 215 when freeing all the objects remaining in the particular heap arena. Thus, profiler agent 220 is apprised of which objects remain in the heap arena by keeping track of the object allocations in the heap arena as well as the movement of objects in and out of the heap arena. In one embodiment of the invention, the "delete_arena" event may be described as follows in a Java ™ virtual machine implementation. Note that the arena_id is the ID of the heap arena being deleted.

```
Struct {
    jint arena_id;
} delete_arena;
```

Virtual machine 210 sends to profiler agent 220 a "new_object" event, also known as an "object_allocate" event when an object is allocated, or when profiler agent 220 requests such an event. In one embodiment of the invention, the "object_allocate" event may be described as follows in a Java™ virtual machine implementation.

```
Struct {
    jint arena_id;
    jobjectID class_id;
    jint is_array;
    jint size;
    jobjectID obj_id;
} obj_alloc;
```

"Arena_id" identifies the heap arena where the objects are to be allocated. "Class_id" either identifies the class to which the object that are to be allocated belong, or the array element class is the "is_array" has a value of "JVMPI_Class". The "is_array" can have values that indicate that it is a normal object, an array of objects, an array of Boolean expressions, etc. Further details may be found in Appendix A. "Size" is the number of bytes, and "obj_id" is the unique object ID.

Virtual machine 210 sends to profiler agent 220 a "delete_object" event, also known as an "object_free" event when an object is freed. In one embodiment of the invention, the "object_free" event may be described as follows in a Java™ virtual machine implementation.

```
Struct {
    jobjectID obj_id;
} obj_free;
```

"Obj_id" identifies the object being freed.

Virtual machine 210 sends to profiler agent 220 a "move_object" event, also known as an "object_move" event when an object is moved to a new location in the heap. In one embodiment of the invention, the "object_move" event may be described as follows in a Java™ virtual machine implementation.

```
Struct {
    jint arena_id;
    jobjectID obj_id;
    jint new_arena_id;
    jobjectID new_obj_id;
} obj_move;
```

"Arena_id" identifies the current heap arena where the object resides. "Obj_id" identifies the current object ID of the object to be moved. "New_arena id" identifies the new heap arena to which the object is to be moved. "New_obj_id" is the new ID assigned to the object after it is moved.

The use of allocation and garbage collection events are described below in connection with various garbage collection methods, such as the Mark-and-Sweep garbage collector, the Mark-Compact garbage collector, the Two-Space Copying garbage collector, the Generational garbage collector, and the Reference-Counting garbage collector.

Profiling Information

The "new_arena" and "delete_arena" events, as in the case of Generational garbage collection, provide useful profiling information such as the number of generations of objects, which objects are most likely to die young, and the relative age of the objects.

The "new_object" and "delete_object" events provide profiling information such as when, which and how many objects are allocated and deleted, as well as information on the classes to which the objects belong.

The "move_object" event, as in the case of the Mark-Compact garbage collection, would provide profiling information such as how frequently compaction had to be performed and what are the associated costs. The frequent need for compaction may be a reflection of the unsuitability of the allocation scheme for the particular user program application. In the case of Generational garbage collection, the "move_object" provides information as to survivability of objects. The longer surviving objects are moved to older heap arenas (older generations).

The combination of all five events provide information on the number of live objects that the program is using at any given time. Such information is highly useful in profiling garbage-collected memory systems.

Mark-and-Sweep Garbage Collector

The invention may be used with a Mark-and-Sweep garbage collector. The Mark-and-Sweep collector is an automatic storage and reclamation tracing garbage collection technique. Whether an object is alive may be determined directly or indirectly. The indirect methods are also referred to as "tracing" methods. Direct methods require for each object in the heap that a record be maintained of all references to that object from other heap objects or roots. In contrast, indirect or tracing garbage collectors visit all reachable objects, starting from the roots of the computation and by following pointers. Thus, the objects that were not visited by the garbage collector are made available for recycling.

Under the Mark-and-Sweep method, objects are not reclaimed immediately after they become garbage, but remain unreachable and undetected until all available storage in the heap is exhausted. If a request is then made for storage space, useful processing is temporarily suspended while the garbage collector is called to sweep all currently unused objects from the heap back into the free-pool. The Mark-and-Sweep collector, being a tracing collector, relies on a global traversal of all live objects to determine which objects are available for reclamation. The traversal of the live objects is the "marking" phase and the reclamation of unused objects is the "sweep" phase. During the "marking" phase, a bit associated with each cell, known as the "mark-bit" is reserved for use by the mark-and-sweep collector. The collector uses the "mark-bit" to record if the object is reachable from the roots of the computation. The mark-bit is set as each reachable object is visited. During the "sweep" phase, the unmarked objects are returned to the free-pool.

When used in conjunction with the allocation and garbage collection events described above, the Mark-and-Sweep collector would issue a "new_object" event when allocating objects. Only one heap arena is needed. The collector sends a "delete_object" event when returning dead objects to the free-pool.

Mark-Sweep-Compact Garbage Collector

The invention may be used with a Mark-Compact garbage collector. Under the Mark-Compact scheme, in addition to marking live objects in the heap, objects are relocated within the heap and the values of pointers that referred to the relocated objects are updated. The marked (live) objects are relocated in order to compact the heap. At the end of the compaction phase, the heap will be divided into two contiguous areas. One area will hold the active or live objects while the other area will hold the free-pool. There are several schemes related to the placement of the relocated objects in the heap. For example, under the "arbitrary" scheme, the live objects may be relocated without regard for their original order, or whether they point to one another. However, such a scheme often leads to reduced virtual memory performance. Under the "linearizing" scheme, live objects that originally pointed to one another are moved into adjacent positions. Under the "sliding" scheme, live objects are slid to one end of the heap.

When used in conjunction with the allocation and garbage collection events described above, the Mark-Compact collector would issue a "new_object" event when allocating objects and a "delete_object" event when returning dead objects to the free-pool. In addition, the collector would issue a "move_object" event in order to perform compaction of the heap. Only one heap arena is used in this case because the old and new heap arena IDs in the "move_object" event are the same. In this case, the relocation of the live objects can be viewed as simply reshuffling the positions of the live objects within the same area. Thus, there is no need for the abstraction of separate multiple heap arenas.

Two-Space-Copying Garbage Collector

The invention may be used with a Two-Space-Copying garbage collector. The Two-Space-Copying collector is tracing collector. Under the Two-Space-Copying scheme, the collector first divides the heap equally into two semi-spaces before any allocation of objects is performed. Allocation of objects occurs only in one of the semi spaces, referred to herein as the "Fromspace". The other semi space, referred to herein as the "Tospace", is reserved for later use. When garbage collection begins, the collector traverses the live objects in the "Fromspace" and copies each live object to the "Tospace". After all the live objects in the, "Fromspace" have been traced, a replica of the live objects has been created in the "Tospace", and the user application program is restarted. The garbage objects are abandoned in the "Fromspace". The collector is said to "scavenge" the live objects from amidst the garbage.

When used in conjunction with the allocation and garbage collection events described above, the Two-Space-Copying collector would issue two "new_arena" events to create two heap arenas representing the two semi-spaces. The collector would issue a "new_object" when allocating objects. During garbage collection, the collector would issue "move_object" events as it scavenges the live objects for placement into the reserved heap arena. Once all the live objects have been scavenged from the old heap arena, the collector sends a "delete_arena" event to delete the old heap arena and thereby freeing all the objects in the old heap arena. Next, in order to restore the two-space scheme, the collector would issue a "new_arena" event using the same arena_id as the old heap arena that was deleted.

Generational Garbage Collector

The invention may be used with a Generational garbage collector. Under the Generational garbage collection scheme, objects are segregated by age into two or more regions of the heap called generations. Different generations can then be garbage collected at different frequencies, with the youngest generation being collected more frequently than the older generations. Objects are first allocated in the youngest generation, but are promoted into older generations if they survive long enough.

When used in conjunction with the allocation and garbage collection events described above, the Generational collector would issue a "new_arena" event to create an heap arena for each generation of objects. In addition, the Generational collector would issue a "new_object" to allocate objects in the youngest generation. The collector would issue a "move_object" event as live objects are scavenged from a younger generation to an older generation. All objects (garbage) in an heap arena are implicitly freed when the collector sends a "delete_arena" event to delete the youngest generation at any given time.

Next, in order to restore the generational scheme, the collector would issue a "new_arena" event using the same arena-id as the youngest generation that was deleted.

Reference-Counting Garbage Collector

The Reference-Counting garbage collector is a direct method of storage reclamation. Under the Reference-Counting scheme, each object has a reference count field used for counting the number of references to the object from other live objects or roots. Free objects have a reference count of zero. When a new object is allocated from the free-pool, its reference count is set to one. Each time a pointer is set to refer to an object, the value of the object's counter is increased by one. Likewise, when a reference to an object is deleted, the object's counter is decreased by one. When an object's counter drops to zero, there are no more pointers to the object and the object becomes garbage.

When used in conjunction with the allocation and garbage collection events described above, the Reference-Counting collector sends a "new_object" event each time an object is allocated, and it sends a "delete_object" event when the reference count of an object drops to zero.

Implementation Mechanisms

A. Overveiw

The approach described herein for comprehensive profiling of Java™ virtual machines may be implemented in computer software, in hardware circuitry, or as a combination of computer software and hardware circuitry. Accordingly, the invention is not limited to a particular computer software or hardware circuitry implementation.

The present invention is both flexible and powerful enough to meet the needs of a wide variety of virtual machine implementations and profiling tools. The invention's power lies in its provision for capturing the behavior of memory systems of the virtual machine using a set of events that are independent of any underlying garbage collection algorithm that has been implemented in the virtual machine.

Although certain embodiments have been described using the Java™ programming language, the present invention can be practiced on a variety of programming languages, and as such should not seen as limited to only the Java™ programming language.

B. Implementation Hardware

Figure 3:
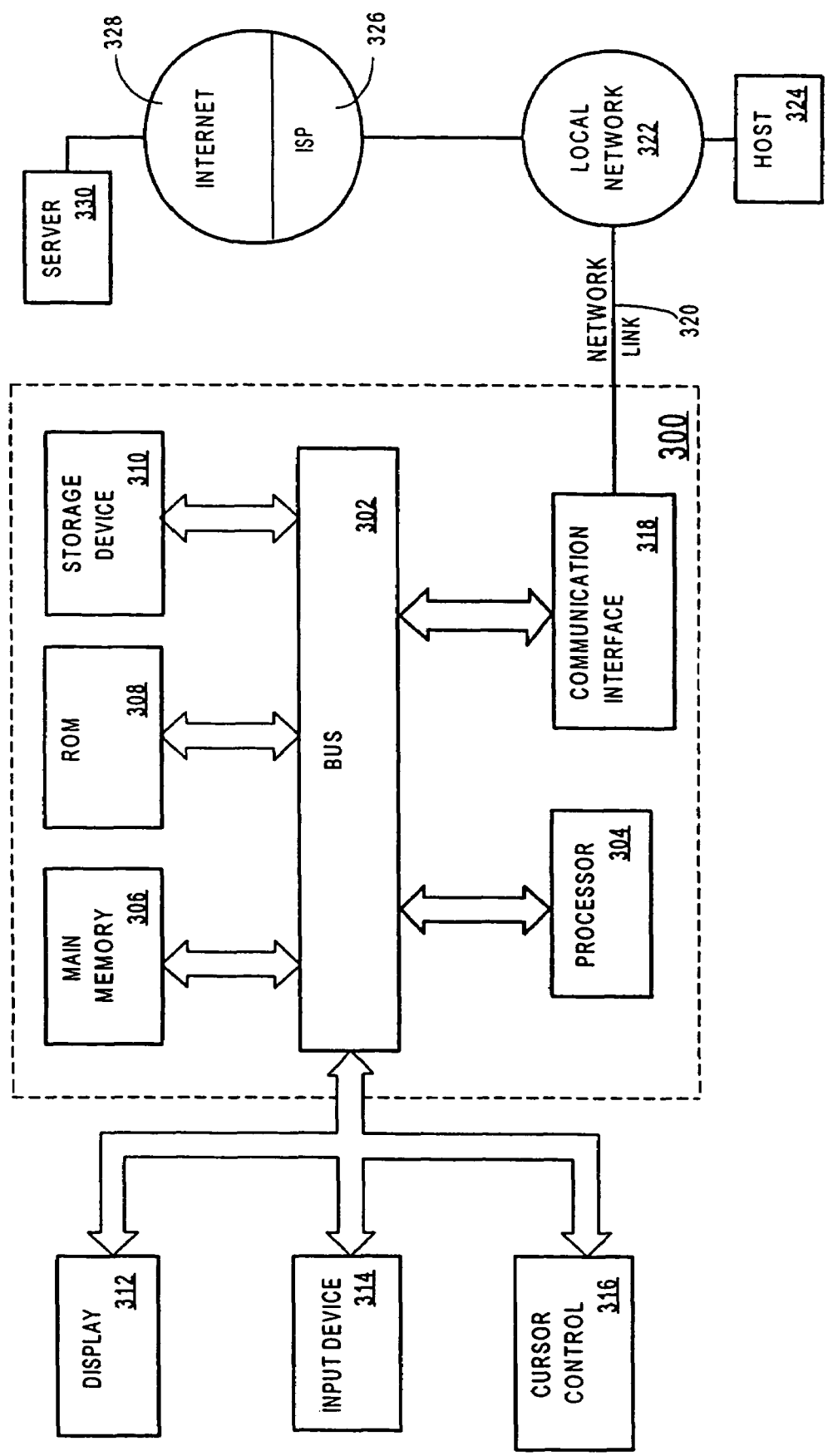
FIG. 3 is a block diagram that illustrates a computer system 300 upon which an embodiment of the invention may be implemented.
Figure 4:
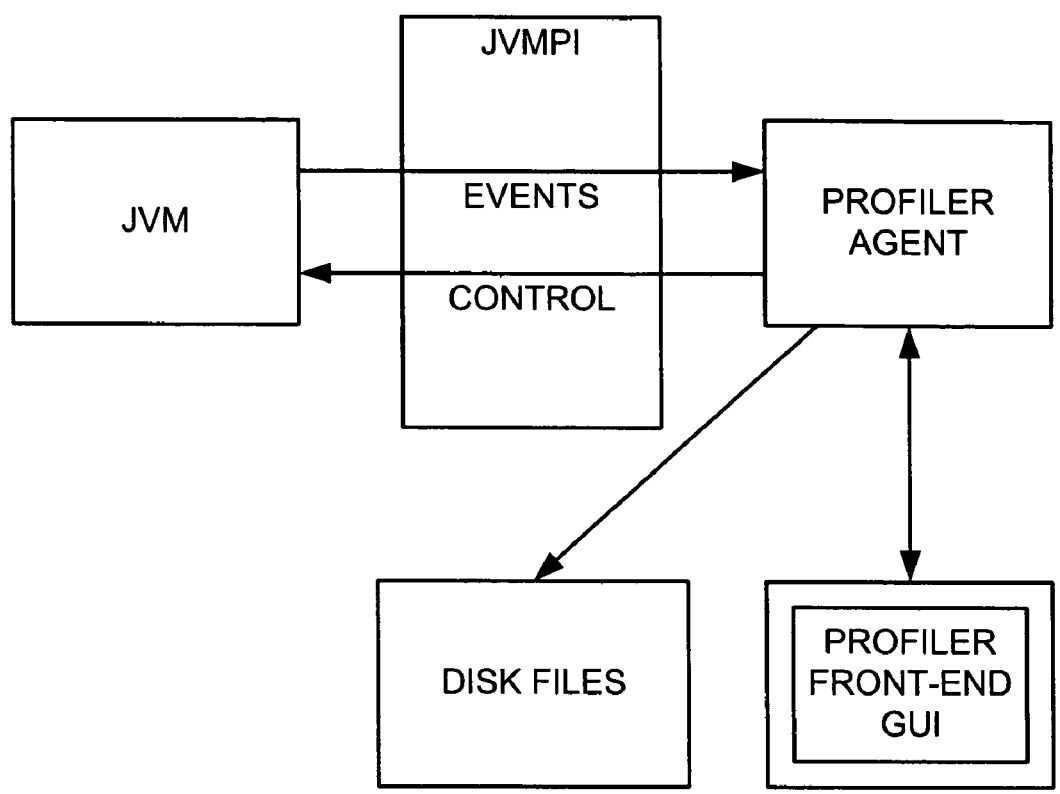
FIG. 4 is a block diagram illustrating an exemplary Java Virtual Machine Profile Interface, as discussed in Appendix A.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing comprehensive profiling of Java™ virtual machines. According to one embodiment of the invention, implementing comprehensive profiling of Java™ virtual machines is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. One or more processors in a multiprocessing arrangement may also be employed to execute the sequences of instructions contained in main memory 306. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for implementing comprehensive profiling of Java™ virtual machines as described herein.

The received code may be executed by processor 304 as it is received, and/or stored in storage device 310, or other non-volatile storage for later execution. In this manner, computer system 300 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

REPLACEMENT APPENDIX A

Java Virtual Machine Profiler Interface (JVMPI)

This document describes the Java Virtual Machine Profiler Interface (JVMPI) in JDK 1.2. It is intended for tools vendors to develop profilers that work in conjunction with Sun's Java virtual machine implementation.

Contents
Overview
    Start-up
    Function Call Interface
    Event Notification
    JVMPI IDs
    Threading and Locking Issues
    Data Communication between the Profiler Agent and Front-End
Interface Functions
    CreateSystemThread
    DisableEvent
    DisableGC
    EnableEvent
    EnableGC
    GetCallTrace
    GetCurrentThreadCpuTime
    GetMethodClass
    GetThreadLocalStorage
    GetThreadObject
    GetThreadStatus
    NotifyEvent
    ProfilerExit
    RawMonitorCreate
    RawMonitorDestroy
    RawMonitorEnter
    RawMonitorExit
    RawMonitorNotifyAll
    RawMonitorWait
    RequestEvent
    ResumeThread
    RunGC
    SetThreadLocalStorage
    SuspendThread
    ThreadHasRun
Events
    JVMPI EVENT ARENA DELETE
    JVMPI EVENT ARENA NEW
    JVMPI EVENT CLASS LOAD JVMPI EVENT CLASS LOAD HOOK
JVMPI EVENT CLASS UNLOAD
JVMPI EVENT COMPILED METHOD LOAD
JVMPI EVENT COMPILED METHOD UNLOAD
JVMPI EVENT DATA DUMP REQUEST
JVMPI EVENT DATA RESET REQUEST
JVMPI EVENT GC FINISH
JVMPI EVENT GC START
JVMPI EVENT HEAP DUMP
JVMPI EVENT JNI GLOBALREF ALLOC
JVMPI EVENT JNI GLOBALREF FREE
JVMPI EVENT JNI WEAK GLOBALREF ALLOC
JVMPI EVENT JNI WEAK GLOBALREF FREE
JVMPI EVENT JVM INIT DONE
JVMPI EVENT JVM SHUT DOWN
JVMPI EVENT METHOD ENTRY
JVMPI EVENT METHOD ENTRY2
JVMPI EVENT METHOD EXIT
JVMPI EVENT MONITOR CONTENDED ENTER
JVMPI EVENT MONITOR CONTENDED ENTERED
JVMPI EVENT MONITOR CONTENDED EXIT
JVMPI EVENT MONITOR DUMP
JVMPI EVENT MONITOR WAIT
JVMPI EVENT MONITOR WAITED
JVMPI EVENT OBJECT ALLOC
JVMPI EVENT OBJECT DUMP
JVMPI EVENT OBJECT FREE
JVMPI EVENT OBJECT MOVE
JVMPI EVENT RAW MONITOR CONTENDED ENTER
JVMPI EVENT RAW MONITOR CONTENDED ENTERED
JVMPI EVENT RAW MONITOR CONTENDED EXIT
JVMPI EVENT THREAD END
JVMPI EVENT THREAD START
Dump Formats
  Sizes and Types Used in Dump Format Descriptions
  Heap Dump Format
  Object Dump Format
  Monitor Dump Format
Data Types
  jobjectID
  JVMPI CallFrame
  JVMPI CallTrace
  JVMPI Field
  JVMPI HeapDumpArq
  JVMPI Lineno
  JVMPI Method
  JVMPI RawMonitor
Notes on JDK1.2 Implementation Limitations 1. Overview The JVMPI is a two-way function call interface between the Java virtual machine and an in-process profiler agent. On one hand, the virtual machine notifies the profiler agent of various events, corresponding to, for example, heap allocation, thread start, etc. On the other hand, the profiler agent issues controls and requests for more information through the JVMPI. For example, the profiler agent can turn on/off a specific event notification, based on the needs of the profiler front-end.

The profiler front-end may or may not run in the same process as the profiler agent It may reside in a different process on the same machine, or on a remote machine connected via the network. The JVMPI does not specify a standard wire protocol. Tools vendors may design wire protocols suitable for the needs of different profiler front-ends.

A profiling tool based on JVMPI can obtain a variety of information such as heavy memory allocation sites, CPU usage hot-spots, unnecessary object retention, and monitor contention, for a comprehensive performance analysis.

JVMPI supports partial profiling, i.e a user can selectively profile an application for certain subsets of the time the virtual machine is up and can also choose to obtain only certain types of profiling information.

In the current version of JVMPI, only one agent per virtual machine can be supported.

1.1. Start-up

The user can specify the name of the profiler agent and the options to the profiler agent through a command line option to the Java virtual machine. For example, suppose the user specifies:

java -Xrunmyprofiler:heapdump=on, file=log.txt
      ToBeProfiledClass

The VM attempts to locate a profiler agent library called myprofiler in Java's library directory:
  On Win32, it is $JAVA_HOME\bin\myprofiler.dll
  On SPARC/Solaris, it is $JAVA_HOME/lib/sparc/libmyprofiler.so
If the library is not found in the Java library directory, the VM continues to search for the library following the normal library search mechanism of the given platform:
  On Win32, the VM searches the current directory, Windows system directories, and the directories in the PATH environment variable.
  On Solaris, the VM searches the directories in LD_LIBRARY_PATH.
The VM loads the profiler agent library and looks for the entry point:

jint JNICALL JVM_OnLoad(JavaVM *jvm, char
      *options, void *reserved);

The VM calls the JVM_OnLoad function, passing a pointer to the JavaVM instance as the first argument, and string"heapdump=on, file=log.txt" as the second argument. The third argument to JVM_OnLoad is reserved and set to NULL.

On success, the JVM_OnLoad function must return JNI_OK. If for some reason the JVM_OnLoad function fails, it must return JNI_ERR.

1.2. Function Call Interface

The profiler agent can obtain a function call interface by issuing a GetEnv call on the JavaVM pointer. For example, the following code retrieves the version of JVMPI interface that is implemented in JDK 1.2:

```
JVMPI_Interface *jvmpi_interface;
JNIEXPORT jint JNICALL JVM_OnLoad(JavaVM *jvm, char *options,
void *reserved)
{
   int res = (*jvm)->GetEnv(jvm, (void **)&jvmpi_interface,
   JVMPI_VERSION_1)
   if (res < 0) {
     return JNI_ERR;
   }
   . . . /* use entries in jvmpi_interface */
}
```

The JVMPI_Interface structure defines the function call interface between the profiler agent and the VM:

```
/* interface functions */
typedef struct {
    jint version;    /* JVMPI version */
    /* ------interface implemented by the profiler------ */
    void (*NotifyEvent) (JVMPI_Event *event);
    /* ------interface implemented by the JVM------ */
    jint (*EnableEvent) (jint event_type, void *arg);
    jint (*DisableEvent) (jint event_type, void *arg);
    jint (*RequestEvent) (jint event_type, void *arg);
    void (*GetCallTrace) (JVMPI_CallTrace *trace, jint depth);
    void (*ProfilerExit) (jint);
    JVMPI_RawMonitor (*RawMonitorCreate) (char *lock_name);
    void (*RawMonitorEnter) (JVMPI_RawMonitor lock_id);
    void (*RawMonitorExit) (JVMPI_RawMonitor lock_id);
    void (*RawMonitorWait) (JVMPI_RawMonitor lock_id, jlong ms);
    void (*RawMonitorNotifyAll) (JVMPI_RawMonitor lock_id);
    void (*RawMonitorDestroy) (JVMPI_RawMonitor lock_id);
    jlong (*GetCurrentThreadCpuTime) (void);
    void (*SuspendThread) (JNIEnv *env);
    void (*ResumeThread) (JNIEnv *env);
    jint (*GetThreadStatus) (JNIEnv *env);
    jboolean (*ThreadHasRun) (JNIEnv *env);
    jint (*CreateSystemThread) (char *name, jint priority, void (*f)
        (void *));
    void (*SetThreadLocalStorage) (JNIEnv *env_id, void *ptr);
    void * (*GetThreadLocalStorage) (JNIEnv *env_id);
    void (*DisableGC) (void);
    void (*EnableGC) (void);
    void (*RunGC) (void);
    jobjectID (*GetThreadObject) (JNIEnv *env);
    jobjectID (*GetMethodClass) (jmethodID mid);
} JVMPI_Interface;
```

The GetEnv function returns a pointer to a JVMPI_Interface whose version field indicates a JVMPI version that is compatible to the version number argument passed in the GetEnv call. Note that the value of the version field is not necessarily identical to the version argument passed in the GetEnv call.

The JVMPI_Interface returned by GetEnv has all the functions set up except for NotifyEvent. The profiler agent must set up the NotifyEvent function pointer before returning from JVM_OnLoad.

1.3. Event Notification

The VM, sends an event by calling NotifyEvent with a JVMPI_Event data structure as the argument. The following events are supported:
    method enter and exit
    object alloc, move, and free
    heap arena create and delete
    GC start and finish
    JNI global reference alloc and free
    JNI weak global reference alloc and free
    compiled method load and unload
    thread start and end
    class file data ready for instrumentation
    class load and unload
    contended Java monitor wait to enter, entered, and exit
    contended raw monitor wait to enter, entered, and exit
    Java monitor wait and waited
    monitor dump
    heap dump
    object dump
    request to dump or reset profiling data
    Java virtual machine initialization and shutdown The JVMPI_Event structure contains the event type, the JNIEnv pointer of the current thread, and other event-specific information The event specific information is represented as a union of event-specific structures. The JVMPI Events section provides a complete description of all event-specific structures. For now, we show the event-specific structures for class load and class unload below.

```
typedef struct {
    jint event_type;              /* event_type */
    JNIEnv *env_id;               /* env where this event occurred */
    union {
        struct {
            char *class_name;         /* class name */
            char *source_name;        /* name of source file */
            jint num_interfaces;      /* number of interfaces
                                         implemented */
            jint num_methods;         /* number of methods in the class */
            JVMPI_Method *methods;    /* methods */
            jint num_static_fields;   /* number of static fields */
            JVMPI_Field *statics;     /* static fields */
            jint num_instance_fields; /* number of instance fields */
            JVMPI_Field *instances;   /* instance fields */
            jobjectID class_id;       /* id of the class object */
        } class_load;
        struct {
            jobjectID class_id;       /* id of the class object */
        } class_unload;
        ... /* Refer to the section on JVMPI events for a full listing */
    } u;
} JVMPI_Event;
```

1.4. JVMPI IDs

The JVMPI refers to entities in the Java virtual machine as various kinds of IDs. Threads, classes, methods, objects, heap arenas and JNI global references all have unique IDs.

Each ID has a defining event and an undefining event. A defining event provides the information related to an ID. For example, the defining event for a thread ID contains, among other entries, the name of the thread.

An ID is valid until its undefining event arrives. An undefining event invalidates the ID, whose value may be reused later as a different kind of ID. The value of a thread ID, for example, may be redefined as a method ID after the thread ends.

| ID | data type | defining event | undefining event |
| --- | --- | --- | --- |
| thread ID | JNIEnv* | thread start | thread end |
| object ID | jobjectID | object alloc | object free, object move, and arena delete |
| class ID | jobjectID | class load | class unload and object move |
| method ID | jmethodID | defining class load | defining class unload |
| arena ID | jint | arena new | arena delete |
| JNI global ref ID | jobject | global ref alloc | global ref free |

Assuming the defining events are enabled during the profiler initialization, the profiler agent is guaranteed to be notified of an entity's creation through a defining event, before the entity appears in other JVMPI events.

If the defining events are not enabled, the profiler agent may receive an unknown ID. In that case the profiler agent may request the corresponding defining event to be sent on demand by issuing a RequestEvent call.

IDs representing objects have type jobjectID. A class is represented by the object ID of the corresponding java.lang.Class object. Therefore, class IDs are also of type jobjectID.

A jobjectID is defined by an object alloc event, and remains valid in the arena in which the object is allocated until one of its undefining events arrive:

An object free event invalidates an object ID.

An object move event is a special type of undefining events. Unlike other undefining events which signal the end-of-life of the corresponding entities, the object still exists, but its ID changes, and it may have been moved to a new arena.

An arena delete event invalidates all remaining object IDs in the arena.

When an object free or arena delete event invalidates an object ID, the object is known as being garbage collected.

Typically, the profiler agent maintains a mapping between jobjectIDS and its internal representation of object identities, and updates the mapping in response to the defining and undefining events for JVMPI object IDs.

Since object IDs may be invalidated during GC, the VM issues all events that contain jobjectID entries with GC disabled. In addition, the profiling agent must disable GC when it is directly manipulating any jobjectID data types. Otherwise the GC may invalidate a jobjectID while it is being manipulated in the agent code. The profiler agent must make sure that GC is disabled when it calls a JVMPI function that either takes a jobjectID argument or returns a jobjectID result. If the function call is inside an event handler where GC is already disabled, then the profiler agent need not explicitly disable the GC again.

A thread may be identified either by its JNIEnv interface pointer or by the object ID of the corresponding java.lang.Thread object. The JNIEnv pointer is valid between thread start and thread end events, and remains constant during the lifetime of a thread. The java.lang.Thread object ID, on the other hand, could remain valid after the thread ends, until it is garbage collected. The profiler agent can convert a JNIEnv pointer to the corresponding thread object ID by calling the GetThreadObject function.

1.5. Threading and Locking Issues

The JBVMPI is used by the profiler agent that runs in the same process as the Java virtual machine. Programmers who write the agent must be careful in dealing with threading and locking issues in order to prevent data corruption and deadlocks.

Events are sent in the same thread where they are generated. For example, a class loading event is sent in the same thread in which the class is loaded. Multiple events may arrive concurrently in different threads. The agent program must therefore provide the necessary synchronization in order to avoid data corruption caused by multiple threads updating the same data structure at the same time.

In some cases, synchronizing on certain frequent events (such as method entry and method exit) may impose unacceptable overhead to program execution. Agents may utilize the thread-local storage support provided by the JVMPI to record profiling data without having to contend for global locks, and only merge the thread-local data into global profiles at selected intervals. The JVMPI supplies the agent with a pointer-size thread-local storage. Following is a simple example that illustrates how a profiler agent may take advantage of this feature. Suppose we need to write a profiler agent that counts the number of methods executed in each thread. The agent installs event handlers for thread start, method entry, and thread end events:

```
/* thread start event handler
 * sets up the storage for thread-local method invocation counter
 */
void ThreadStartHandler(JNIEnv *thread_id)
{
    int *p_ctr = (int *)malloc(sizeof(int));
    CALL(SetThreadLocalStorage) (thread_id, p_ctr);
}
/* method enter event handler
 * increments thread local method invocation counter
 */
void MethodEntryHandler(jmethodID method_id, JNIEnv *thread_id)
{
    int *p_ctr = (int *)CALL(GetThreadLocalStorage) (thread_id);
    (*p_ctr)++;
}
/* thread end handler
 * prints the number of methods executed
 */
void ThreadEndHandler(JNIEnv *thread_id)
{
    int *p_ctr = (int *)CALL(GetThreadLocalStorage) (thread_id);
    fprintf(stdout, "Thread %x executed %d methods\n",
        thread_id, (*p_ctr));
    free(p_ctr);
}
```

The following JVMPI functions can cause event notification to be sent synchronously in the same thread during the function execution:

RequestEvent

CreateSystemThread

RunGC

The RequestEvent function supplies the JVMPI event explicitly requested by the profiler agent. The CreateSystemThread function causes thread object allocation and thread start events to be issued. The RunGC function causes GC-related events to be generated.

When a profiling agent is loaded into the Java virtual machine, the process can either be in one of three modes: multi-threaded mode with GC enabled, multi-threaded mode with GC disabled, and the thread suspended mode. Different JVMPI events are issued in different modes. Certain JVMPI functions change the process from one mode to another.

The profiler agent must obey the following guidelines to avoid deadlocks:

In the multi-threaded mode with GC enabled, the agent code has a great deal of freedom in acquiring locks and calling JVMPI functions. Of course the normal rules of deadlock avoidance apply. Different threads must not enter the same set of locks in different orders.

When the GC is disabled the agent program must not call any JVMPI function that could require new Java objects to be created or cause the garbage collector to run. Currently, such functions include CreatesystemThread and RunGC. In addition, programmers need to be aware that disabling the GC creates an implicit locking dependency among threads. When the GC is disabled, the current thread may not be able to safely acquire certain locks. Deadlocks may happen, for example, if one thread disables GC and tries to acquire a lock, while another thread already acquired that lock but is triggering a GC.

In the thread suspended mode, one or more of the threads have been suspended. In this case, the agent program must not perform any operations that may cause the current thread to block. Such operations include, for example, the malloc and fprintf functions provided by the standard C library. These functions typically acquire internal C library locks that may be held by one of the suspended threads.

1.6 Data Communication between the Profiler Agent and Front-End

The JVMPI provides a low-level mechanism for a profiler agent to communicate with the virtual machine. The goal is to provide maximum flexiblity for the profiler agent to present the data depending on the needs of the front-end, and also to keep the processing work done by the virtual machine at a minimum. Therefore, the JVMPI does not specify a wire protocol between the profiling agent and the front-end. Instead, tools vendors design their own profiling agents that suit the needs of their front-ends.

The following issues need to be considered when designing the wire protocol in order to allow the profiler agent and front-end to reside on different machines:

Pointer size (e.g., 32 or 64 bit)—all of the JVMPI IDs are of pointer type (see Data Types).

Byte order (little endian or big endian).

Bit order (most significant bit first or least significant bit first).

String encoding—the JVMPI uses the UTF-8 encoding as documented in the Java virtual machine specification.

For example, the hprof profiler agent shipped with JDK 1.2 sends the size of all IDs as the first record, and uses the standard network byte order for integer and floating-point data.

2. Interface Functions

```
jint (*CreateSystemThread) (char *name, jint priority,
    void (*f) (void *));
```

Called by the profiler agent to create a daemon thread in the Java virtual machine.

It is safe for the profiler agent to make this call only after the JVM notifies a JVMPI_EVENT_INIT_DONE and when the system is in a multi-threaded mode with GC enabled.

```
Arguments:
    name     - name of the thread.
    priority - thread priority; the values can be:
                 JVMPI_NORMAL_PRIORITY
                 JVMPI_MAXIMUM_PRIORITY
                 JVMPI_MINIMUM_PRIORITY
    f        - function to be run by the thread.
Returns:
    JNI_OK  - success.
    JNI_ERR - failure.
```

```
jint (*DisableEvent) (jint event _type, void *arg);
```

Called by the profiler agent to disable the notification of a particular type of event. Apart from event_type, the profiler agent may also pass an argument that provides additional information specific to the given event type.

All events are disabled when the VM starts up. Once enabled, an event stays enabled until it is explicitly disabled.

This function returns JVMPI_NOT_AVAILABLE if event type is JVMPI_EVENT_HEAP_DUMP, JVMPI_EVENT_MONITOR_DUMP or JVMPI_EVENT_OB-JECT_DUMP.

```
Arguments:
    event_type - type of event, JVMPI_EVENT_CLASS_LOAD
                 etc.
    arg        - event specific information.
Returns:
    JVMPI_SUCCESS           disable succeeded.
    JVMPI_FAIL              disable failed.
    JVMPI_NOT_AVAILABLE     support for disabling the given event_type
                            is not available.
```

```
void (*DisableGC) (void);
```

Called by the profiler to disable garbage collection, until EnabledGC is called. DisableGC and EnableGC calls may be nested.

```
jint (*EnableEvent) (jint event_type, void *arg);
```

Called by the profiler agent to enable notification of a particular type of event. Apart from event_type, the profiler may also pass an argument that provides additional information specific to the given event type.

All events are disabled when the VM starts up. Once enabled, an event stays enabled until it is explicitly disabled.

This function returns JVMPI_NOT_AVAILABLE if event_type is JVMPI_EVENT_HEAP_DUMP, JVMPI_EVENT_MONITOR_DUMP or JVMPI_EVENT_OBJECT_DUMP. The profiler agent must use the RequestEvent function to request these events.

```
Arguments:
    event_type - type of event, JVMPI_EVENT_CLASS_LOAD
                 etc.
    arg        - event specific argument.
Returns:
    JVMPI_SUCCESS           enable succeeded.
    JVMPI_FAIL              enable failed.
    JVMPI_NOT_AVAILABLE     support for enabling the given
                            event_type is not available.
```

```
void (*EnableGC) (void);
```

Enables garbage collections. DisableGC and EnableGC calls may be nested.

```
void (*GetCallTrace) (JVMPI_CallTrace *trace, jint
    depth);
```

Called by the profiler to obtain the current method call stack trace for a given thread. The thread is identified by the env_id field in the JVMPI_CallTrace structure. The profiler agent should allocate a JVMPI_CallTrace structure with enough memory for the requested stack depth. The VM fills in the frames buffer and the num_frames field.

```
Arguments:
    trace - trace data structure to be filled by the VM.
    depth - depth of the call stack trace.
jlong (*GetCurrentThreadCpuTime) (void);
    Called by the profiler agent to obtain the accumulated CPU time
    consumed by the current thread.
    Returns:
        time in nanoseconds
```

```
jobjectID (*GetMethodClass) (jmethodID mid);
```

Called by the profiler agent to obtain the object ID of the class that defines a method.
The profiler must disable GC before calling this function.

```
Arguments:
    mid - a method ID.
Returns:
    object ID of the defining class.
```

```
void * (*GetThreadLocalStorage) (JNIEnv *env_id);
```

Called by the profiler to get the value of the JVMPI thread-local storage. The JVMPI supplies to the agent a pointer-size thread-local storage that can be used to record per-thread profiling information.

```
Arguments:
    env_id - the JNIEnv * of the thread.
Returns:
    the value of the thread local storage
```

```
jobjectID (*GetThreadObject) (JNIEnv *env);
```

Called by the profiler agent to obtain the thread object ID that corresponds to a JNIEnv pointer.
The profiler must disable GC before calling this function.

```
Arguments:
    env - JNIEnv pointer of the thread.
Returns:
    the thread object ID.
```

```
jint (*GetThreadStatus) (JNIEnv *env);
```

Called by the profiler agent to obtain the status of a thread. The JVMPI functions SuspendThread and ResumeThread have no affect on the status returned by GetThreadStatus. The status of a thread suspended through the JVMPI remains unchanged and the status at the time of suspension is returned.

```
Arguments:
    env - the JNIEnv * of the thread.
Returns:
    JVMPI_THREAD_RUNNABLE      - thread is runnable.
    JVMPI_THREAD_MONITOR_WAIT  - thread is waiting on
                                 a monitor.
    JVMPI_THREAD_CONDVAR_WAIT  - thread is waiting
                                 on a condition variable.
```

When a thread is suspended (by java.lang.Thread.suspend) or interrupted in any of the above states the JVMPI_THREAD_SUSPENDED or the JVMPI_THREAD_INTERRUPTED bit is set.

```
void (*NotifyEvent) (JVMPI_Event *event);
```

Called by the VM to send an event to the profiling agent. The profiler agent registers the types of events it is interested in by calling EnableEvent, or requests a specific type of event by calling RequestEvent.
When an event is enabled by EnableEvent, the thread that generates the event is the thread in which the event is sent. When an event is requested by RequestEvent, the thread that requests the event is the thread in which the event is sent. Multiple threads may send multiple events concurrently.
If the event specific information contains a jobjectID, this function is called with GC disabled. GC is enabled after the function returns.
The space allocated for the JVMPI_Event structure and any event specific information is freed by the virtual machine once this function returns. The profiler agent must copy any necessary data it needs to retain into its internal buffers.

```
Arguments:
    event - the JVMPI event sent from the VM to the profiling agent.
```

```
void (*ProfilerExit) (jint err_code);
```

Called by the profiler agent to inform the VM that the profiler wants to exit with error code set to err_code. This function causes the VM to also exit with the same err_code.

```
Arguments:
    err_code - exit code
```

```
JVMPI_RawMonitor (*RawMonitorCreate) (char
    *lock_name);
```

Called by the profiler to create a raw monitor.
Raw monitors are similar to Java monitors. The difference is that raw monitors are not associated with Java objects.
It is not safe for the profiler agent to call this function in the thread suspended mode because this function may call arbitrary system functions such as malloc and block on an internal system library lock.
If the raw monitor is created with a name beginning with an underscore ('_'),then its monitor contention events are not sent to the profiler agent.

```
Arguments:
    lock_name - name of raw monitor.
Returns:
    a raw monitor
```

```
void (*RawMonitorDestroy) (JVMPI_RawMonitor
    lock_id);
```

Called by the profiler agent to destroy a raw monitor and free all system resources associated with the monitor.
Raw monitors are similar to Java monitors. The difference is that raw monitors are not associated with Java objects.
It is not safe for the profiler agent to call this function in the thread suspended mode because this function may call arbitrary system functions such as free and block on a internal system library lock.

```
Arguments:
    lock_id - the raw monitor to be destroyed
```

```
void (*RawMonitorEnter) (JVMPI_RawMonitor
    lock_id);
```

Called by the profiler agent to enter a raw monitor.
Raw monitors are similar to Java monitors. The difference is that raw monitors are not associated with Java objects.
It is not safe for the profiler agent to call this function in the thread suspended mode because the current thread may block on the raw monitor already acquired by one of the suspended threads.

```
Arguments:
    lock_id - the raw monitor to be entered
```

```
void (*RawMonitorExit) (JVMPI_RawMonitor
    lock_id);
```

Called by the profiler agent to exit a raw monitor.
Raw monitors are similar to Java monitors. The difference is that raw monitors are not associated with Java objects.

```
Arguments:
    lock_id - the raw monitor to exit
```

```
void (*RawMonitorNotifyAll) (JVMPI_RawMonitor
    lock_id);
```

Called by the profiler to notify all the threads that are waiting on a raw monitor.
Raw monitors are similar to Java monitors. The difference is that raw monitors are not associated with Java objects.

```
Arguments:
    lock_id - the raw monitor to notify
```

```
void (*RawMonitorWait) (JVMPI_RawMonitor
    lock_id, jlong ms);
```

Called by the profiler agent to wait on a raw monitor for a specified timeout period. Passing 0 as the timeout period causes the thread to wait forever.
Raw monitors are similar to Java monitors. The difference is that raw monitors are not associated with Java objects.

```
Arguments:
    lock_id  - the raw monitor to wait on
    ms       - time to wait (in milliseconds).
```

```
jint (*RequestsEvent) (jint event_type, void *arg);
```

Called by the profiler agent to request a particular type of event to be notified. Apart from event_type, the profiler agent may also pass an argument that provides additional information specific to the given event type.
This function can be called to request one-time events such as JVMPI_EVENT_HEAP_DUMP, JVMPI_EVENT_MONITOR_DUMP and JVMPI_EVENT_OBJECT_DUMP. Notification for these events cannot be controlled by the EnableEvent and DisableEvent functions.
In addition, this function can be called to request the defining events for a specific class, thread, or object. This is useful when the profiler agent needs to resolve an unknown class, method, thread, or object ID received in an event, but the corresponding defining event was disabled earlier.

The profiler agent may receive information about an unknown class ID by requesting a JVMPI_EVENT_CLASS_LOAD event and setting the event-specific argument to the class object ID.

The profiler agent may receive information about an unknown thread ID by requesting a JVMPI_EVENT_THREAD_START event and setting the event-specific argument to the thread object ID.

The profiler agent may receive information about an unknown object ID by requesting a JVMPI_EVENT_OBJECT_ALLOC event and setting the event-specific argument to the object ID.

Thus the profiler agent can either enable the above three events asynchronously by calling EnableEvent, or request these events synchronously by calling RequestEvent. The requested event is sent in the same thread that issued the RequestEvent call, and is sent before the RequestEvent function returns.

The RequestEvent function cannot be used to request other events not listed above.

Events requested through RequestEvent will arrive with the JVMPI_REQUESTED_EVENT bit set in its event_type.

```
Arguments:
    event_type  - type of event, JVMPI_EVENT_CLASS_LOAD
                  etc.
    arg         - event specific argument.
Returns:
    JVMPI_SUCCESS           request succeeded.
    JVMPI_FAIL              request failed.
    JVMPI_NOT_AVAILABLE     support for issuing the requested
                            event_type is not available.
```

```
void (*ResumeThread) (JNIEnv *env);
```

Called by the profiler agent to resume a thread.
Note that a thread suspended by the java.lang.Thread.suspend method cannot be resumed by the JVMPI ResumeThread function.

```
Arguments:
    env - the JNIEnv * of the thread.
```

```
void (*RunGC) (void);
```

Called by the profiler to force a complete garbage collection. This function must not be called when GC is disabled.

```
void (*setThreadLocalStorage) (JNIEnv *env_id, void
    *ptr);
```

Called by the profiler agent to set the value of the JVMPI thread-local storage. The JVMPI supplies to the agent a pointer-size thread-local storage that can be used to record per-thread profiling information.

```
Arguments:
    env_id  - the JNIEnv * of the thread.
    ptr     - the value to be entered into the thread-local storage.
```

```
void (*SuspendThread) (JNIEnv *env);
```

Called by the profiler agent to suspend a thread. The system enters the thread suspended mode after this function is called.

Note that a thread suspended by the JVMPI Suspend-Thread function cannot be resumed by the java.lang.Thread.resume method.

In the JDK 1.2 implementation, this function must be called when the GC is disabled. GC must remain disabled until all threads have been resumed.

```
Arguments:
    env - the JNIEnv * of the thread.
```

```
jboolean (*ThreadHasRun) (JNIEnv *env);
```

Called by the profiler to determine if a thread identified by the given JNIEnv pointer has consumed CPU time since the last time the thread was suspended by Suspend-Thread. This function must be called when the thread has been resumed by ResumeThread and then suspended again by the SuspendThread function.

```
Arguments:
    env - the JNIEnv * of the thread.
Returns:
    JNI_TRUE - thread got a chance to run.
    JNI_FALSE - thread did not get a chance to run.
```

3. Events

JVMPI_EVENT_ARENA_DELETE

Sent when a heap arena is deleted.

All objects residing in this arena are freed. An explicit JVMPI_EVENT_OBJECT_FREE is not sent for those objects. The profiler agent can infer all the objects currently residing in that arena by keeping track of the object allocations in the arena and all the objects moved in and out of the arena This event is issued in the thread suspended mode. The profiler must not make any blocking calls such as entering a monitor or allocating from the C heap (for example, via malloc).

This event is always sent between a pair of JVMPI_EVENT_GC_START and JVMPI_EVENT_GC_FINISH events. The profiler agent should acquire all the locks need for processing this event in the event handler for JVMPI_EVENT_GC_START.

```
struct {
    jint arena_id;
} delete_arena;
Contents:
    arena_id - ID of the arena being deleted.
```

JVMPI_EVENT_ARENA_NEW

Sent when a new arena for allocating objects is created.

```
struct {
    jint arena_id;
    char *arena_name;
} new_arena;
Contents:
    arena_id - ID given to the arena.
    arena_name - name of the arena.
```

JVMPI_EVENT_CLASS_LOAD

Sent when a class is loaded in the VM, or when the profiler agent requests a JVMPI_EVENT_CLASS_LOAD event by issuing a RequestEvent call. In the latter case, the JVMPI_REQUESTED_EVENT bit in the event type is set This event is issued with GC disabled. GC is re-enabled after NotifyEvent returns.

```
struct {
    char *class_name;
    char *source_name;
    jint num_interfaces;
    jint num_methods;
    JVMPI_Method *methods;
    jint num_static_fields;
    JVMPI_Field *statics;
    jint num_instance_fields;
    JVMPI_Field *instances;
    jobjectID class_id;
} class_load;
Contents:
    class_name         - name of class being loaded.
    source_name        - name of source file that defines the class.
    num_interfaces     - number of interfaces implemented by this
                         class.
    methods            - methods defined in the class.
    num_static_fields  - number of static fields defined in this class.
    statics            - static fields defined in the class.
    num_instance_fields - number of instance fields defined in this class.
    instances          - instance fields defined in the class.
    class_id           - class object ID.
```

Note:
class IDs are IDs of the class objects and are subject to change when JVMPI_EVENT_OBJECT_MOVE arrives.

JVMPI_EVENT_CLASS_LOAD_HOOK

Sent when the VM obtains a class file data, but before it constructs the in-memory representation for that class. The profiler agent can instrument the existing class file data sent by the VM to include profiling hooks.

The profiler must allocate the space for the modified class file data buffer using the memory allocation function pointer sent in this event, because the VM is responsible for freeing the new class file data buffer.

```
struct {
    unsigned char *class_data;
    jint class_data_len;
    unsigned char *new_class_data;
    jint new_class_data_len;
    void * (*malloc_f) (unsigned int);
} class_load_hook;
Contents:
    class_data         - pointer to the current class file data buffer.
    class_data_len     - length of current class file data buffer.
    new_class_data     - pointer to the instrumented class file data
                         buffer.
    new_class_data_len - length of the new class file data buffer.
    malloc_f           - pointer to a memory allocation function.
```

The profiler agent must set new_class_data to point to the newly instrumented class file data buffer and set new_class_data_len to the length of that buffer before returning from Notifyevent. It must set both new_class_data and new_class_data_len to the old values if it chooses not to instrument this class.

JVMPI_EVENT_CLASS_UNLOAD

Sent when a class is unloaded.
This event is issued with GC disabled. GC is re-enabled after NotifyEvent returns.

```
struct {
    jobjectID class_id;
} class_unload;
Contents:
    class_id - class being unloaded.
```

JVMPI_EVENT_COMPILED_METHOD_LOAD

Sent when a method is compiled and loaded into memory.

```
struct {
    jmethodID method_id;
    void *code_addr;
    jint code_size;
    jint lineno_table_size;
    JVMPI_Lineno *lineno_table;
} compiled_method_load;
Contents:
    method_id        - method being compiled and loaded.
    code_addr        - address where compiled method code is loaded.
    code_size        - size of compiled code.
    lineno_table_size - size of line number table.
    lineno_table     - table mapping offset from beginning of method
                       to the src file line number.
```

JVMPI_EVENT_COMPILED_METHOD_UNLOAD

Sent when a compiled method is unloaded from memory.

```
struct {
    jmethodID method_id;
} compiled_method_unload;
Contents:
    method_id - compiled method being unloaded.
```

JVMPI_EVENT_DATA_DUMP_REQUEST

Sent by the VM to request the profiler agent to dump its data. This is just a hint and the profiler agent need not react to this event. This is useful for processing command line signals from users. For example, in JDK 1.2 a CTRL-Break on Win32 and a CTRL-\ on Solaris causes the VM to send this event to the profiler agent.
There is no event specific information.

JVMPI_EVENT_DATA_RESET_REQUEST

Sent by the VM to request the profiler agent to reset its data. This is just a hint and the profiler agent need not react to this event. This is useful for processing command line signals from users. For example, in JDK 1.2 a CTRL-Break on Win32 and a CTRL-\ on Solaris causes the VM to send this event to the profiler agent.
There is no event specific information.

JVMPI_EVENT_GC_FINISH

Sent when GC finishes. The profiler agent can release any locks, grabbed during GC start notification for handling object free, object move, and arena delete events. The system gets back into the multi-threaded mode after this event.
The event-specific data contains Java heap statistics.

```
struct {
    jlong used_objects;
    jlong used_object_space;
    jlong total_object_space;
} gc_info;
Contents:
    used_objects        - number of used objects on the heap.
    used_object_space   - amount of space used by the objects (in bytes).
    total_object_space  - total amount of object space (in bytes).
```

JVMPI_EVENT_GC_START

Sent when GC is about to start. The system goes into thread suspended mode after this event. To avoid deadlocks, the profiler agent should grab any locks that are needed for handling object free, object move, and arena delete events in the event handler for this event.
There is no event specific information.

JVMPI_EVENT_HEAP_DUMP

Sent when requested by the RequestEvent function. The profiler agent can specify the level of information to be dumped by passing an JVMPI_HeapDumpArg structure to RequestEvent as the second argument, with the heap_dump_level field set to the desired dump level.
The dump level values can be one of the following:
    JVMPI_DUMP_LEVEL_0
    JVMPI_DUMP_LEVEL_1
    JVMPI_DUMP_LEVEL_2
If a NULL value is passed, then the dump level is set to JVMPI_DUMP_LEVEL_2.
This event is issued with GC disabled. GC is re-enabled after NotifyEvent returns.
The event-specific data contains a snapshot of all live objects in the Java heap.

```
struct {
    int dump_level;
    char *begin;
    char *end;
    jint num_trac s;
    JVMPI_CallTrace *traces;
} heap_dump;
Contents:
    dump_level  - the dump level specified in RequestEvent
    begin       - beginning of the heap dump
    end         - end of the heap dump
    num_traces  - number of stack traces in which the GC roots reside,
                  0 for JVMPI_DUMP_LEVEL_0
    traces      - the stack traces in which the GC roots reside
```

The format of the heap dump between begin and end depends on the level of information requested. The formats are described in detail in the JVMPI Dump Formats section.

JVMPI_EVENT_JNI_GLOGALREF_ALLOC

Sent when a JNI global reference is created. The event-specific data contains the JNI global reference as well as the corresponding object ID.

This event is issued with GC disabled. GC is re-enabled after NotifyEvent returns.

```
struct {
    jobjectID obj_id;
    jobject ref_id;
} jni_globalref_alloc;
Contents:
    obj_id - object ID referred to by the global reference.
    ref_id - JNI global reference.
```

JVMPI_EVENT_JNI_GLOBALREF_FREE

Sent when a JNI global reference is deleted. The event-specific data contains the JNI global reference that is being deleted.

```
struct {
    jobject ref_id;
} jni_globalref_free;
Contents:
    ref_id - JNI global reference.
```

JVMPI_EVENT_JNI_WEAK_GLOBALREF_AL-
LOC

Sent when a JNI weak global reference is created. The event-specific data contains the JNI weak global reference as well as the corresponding object ID.
This event is issued with GC disabled. GC is re-enabled after NotifyEvent returns.

```
struct {
    jobjectID obj_id;
    jobject ref_id;
} jni_globalref_alloc;
Contents:
    obj_id - object ID referred to by the weak global reference.
    ref_id - JNI weak global reference.
```

JVMPI_EVENT_JNI_WEAK_GLOBALREF_FREE

Sent when a JNI weak global reference is deleted. The event-specific data contains the JNI weak global reference that is being deleted.

```
struct {
    jobject ref_id;
} jni_globalref_free;
Contents:
    ref_id - JNI weak global reference.
```

JVMPI_EVENT_JVM_INIT_DONE

Sent by the VM when its initialization is done. It is safe to call CreateSystemThread only after this event is notified.
There is no event specific data.

JVMPI_EVENT_JVM_SHUT_DOWN

Sent by the VM when it is shutting down. The profiler typically responds by saving the profiling data.
There is no event specific data.

JVMPI_EVENT_METHOD_ENTRY

Sent when a method is entered. Compared with JVMPI_EVENT_METHOD_ENTRY2, this event does not send the jobjectID of the target object on which the method is invoked.

```
struct {
    jmethodID method_id;
} method;
Contents:
    method_id - the method being entered.
```

JVMPI_EVENT_METHOD_ENTRY2

Sent when a method is entered. If the method is an instance method, the jobjectID of the target object is sent with the event. If the method is a static method, the obj_id field in the event is set to NULL.
This event is issued with GC disabled. GC is re-enabled after NotifyEvent returns.

```
struct {
    jmethodID method_id;
    jobjectID obj_id;
} method_entry2;
Contents:
    method_id   - the method being entered.
    obj_id      - the target object, NULL for static methods.
```

JVMPI_EVENT_METHOD_EXIT

Sent when a method is exited. The method exit may be a normal exit, or caused by an unhandled exception.

```
struct {
    jmethodID method_id;
} method;
Contents:
    method_id - the method being entered.
```

JVMPI_EVENT_MONITOR_CONTEND-
ED_ENTER

Sent when a thread is attempting to enter a Java monitor already acquired by another thread.
This event is issued with GC disabled. GC is re-enabled after NotifyEvent returns.

```
struct {
    jobjectID object;
} monitor;
Contents:
    object - object ID associated with the monitor
```

JVMPI_EVENT_MONITOR_CONTEND-
ED_ENTERED

Sent when a thread enters a Java monitor after waiting for it to be released by another thread.
This event is issued with GC disabled. GC is re-enabled after NotifyEvent returns.

```
struct {
    jobjectID object;
} monitor;
Contents:
    object - object ID associated with the monitor
```

JVMPI_EVENT_MONITOR_CONTENED_EXIT

Sent when a thread exits a Java monitor, and another thread is waiting to acquire the same monitor.
This event is issued with GC disabled. GC is re enabled after NotifyEvent returns.

```
struct {
    jobjectID object;
} monitor;
Contents:
    object - object ID associated with the monitor
```

JVMPI_EVENT_MONITOR_DUMP

Sent when requested by the RequestEvent function
The event-specific data contains a snapshot of all the threads and monitors in the VM.
This event is issued with GC disabled. GC is re-enabled after NotifyEvent returns.

```
struct {
    char *begin;
    char *end;
    jint num_traces;
    JVMPI_CallTrace *traces;
    jint *threads_status;
} monitor_dump;
Contents:
    begin          - start of the monitor dump buffer.
    end            - end of the dump buffer
    num_traces     - number of thread traces.
    traces         - traces of all threads.
    thread_status  - status of all threads.
```

The format of the monitor dump buffer is described in detail in the JVMPI Dump Formats section.

JVMPI_EVENT_MONITOR_WAIT

Sent when a thread is about to wait on an object.
This event is issued with GC disabled. GC is re-enabled after NotifyEvent returns.

```
struct {
    jobjectID object;
    jlong timeout;
} monitor_wait;
Contents:
    object  - ID of object on which the current thread is
              going to wait.
              (NULL indicates the thread is in Thread.sleep.)
    timeout - the number of milliseconds the thread will wait. (0 indicates
              waiting forever.)
```

JVMPI_EVENT_MONITOR_WAITED

Sent when a thread finishes waiting on an object.
This event is issued with GC disabled. GC is re-enabled after NotifyEvent returns.

```
struct {
    jobjectID object;
    jlong timeout;
} monitor_wait;
Contents:
    object  - ID of object on which the current thread waited.
              (NULL indicates the thread is in Thread.sleep.)
    timeout - the number of milliseconds the thread waited.
```

JVMPI_EVENT_OBJECT_ALLOC

Sent when an object is allocated, or when the profiler agent requests a JVMPI_EVENT_OBJECT_ALLOC event by issuing a RequestEvent call. In the latter case, the JVMPI_REQUESTED_EVENT bit in the event type is set.
This event is issued with GC disabled. GC is re-enabled after NotifyEvent returns.

```
struct {
    jint arena_id;
    jobjectID class_id;
    jint is_array;
    jint size;
    jobjectID obj_id;
} obj_alloc;
Contents:
    arena_id  - arena where allocated.
    class_id  - class to which this object belongs, or the array element
                class if is_array is JVMPI_CLASS.
    is_array  - values can be:
        JVMPI_NORMAL_OBJECT    normal object
        JVMPI_CLASS            array of objects
        JVMPI_BOOLEAN          array of booleans
        JVMPI_BYTE             array of bytes
        JVMPI_CHAR             array of chars
        JVMPI_SHORT            array of shorts
        JVMPI_INT              array of ints
        JVMPI_LONG             array of longs
        JVMPI_FLOAT            array of floats
        JVMPI_DOUBLE           array of doubles
    size      - size in number of bytes.
    obj_id    - unique object ID.
```

JVMPI_EVENT_OBJECT_DUMP

Sent when requested by the ReguestEvent function. The jobjectID of the object for which a dump is being requested should be passed as the second argument to RequestEvent.
The profiler agent should request this event with GC disabled.
The event-specific data contains a snapshot of the object.

```
struct {
    jint data_len;
    char *data;
} object_dump;
Contents:
    data_len - length of the object dump buffer
    data     - beginning of the object dump
```

The format of the object dump buffer is described in detail in the JVMPI Dump Formats section.

JVMPI_EVENT_OBJECT_FREE

Sent when an object is freed.

This event is issued in the thread suspended mode. The profiler must not make any blocking calls such as entering a monitor or allocating from the C heap (for example, via malloc).

This event is always sent between a pair of JVMPI_EVENT_GC_START and JVMPI_EVENT_GC_FINISH events. The profiler agent should acquire all the locks need for processing this event in the event handler for JVMPI_EVENT_GC_START.

```
struct {
    jobjectID obj_id;
} obj_free;
Contents:
    obj_id - object being freed.
```

JVMPI_EVENT_OBJECT_MOVE

Sent when an object is moved in the heap.

This event is issued in the thread suspended mode. The profiler must not make any blocking calls such as entering a monitor or allocating from the C heap (for example, via malloc).

This event is always sent between a pair of JVMPI_EVENT_GC_START and JVMPI_EVENT_GC_FINISH events. The profiler agent should acquire all the locks need for processing this event in the event handler for JVMPI_EVENT_GC_START.

```
struct {
    jint arena_id;
    jobjectID obj_id;
    jint new_arena_id;
    jobjectID new_obj_id;
} obj_move;
Contents:
    arena_id      - current arena.
    obj_id        - current object ID.
    new_arena_id  - new arena.
    new_obj_id    - new object ID.
```

JVMPI_EVENT_RAW_MONITOR_CONTENDED_ENTER

Sent when a thread is attempting to enter a raw monitor already acquired by another thread.

```
struct {
    char *name;
    JVMPI_RawMonitor id;
} raw_monitor;
Contents:
    name - name of the raw monitor
    id   - ID of the raw monitor
```

JVMPI_EVENT_RAW_MONITOR_CONTENDED_ENTERED

Sent when a thread enters a raw monitor after waiting for it to be released by another thread.

```
struct {
    char *name;
    JVMPI_RawMonitor id;
} raw_monitor;
```

Contents:
    name - name of the raw monitor
    id   - ID of the raw monitor

JVMPI_EVENT_RAW_MONITOR_CONTENDED_EXIT

Sent when a thread exits a raw monitor, and another thread is waiting to acquire the same monitor.

```
struct {
    char *name;
    JVMPI_RawMonitor id;
} raw_monitor;
Contents:
    name - name of the raw monitor
    id   - ID of the raw monitor
```

JVMPI_EVENT_THREAD_END

Sent when a thread ends in the VM.

The env_id field of the JVMPI_Event received in this event notification is the JNIEnv interface pointer of the thread that ended.

JVMPI_EVENT_THREAD_START

Sent when a thread is started in the VM, or when the profiler agent requests a JVMPI_EVENT_THREAD_START event by issuing a RequestEvent call. In the latter case, the JVMPI_REQUESTED_EVENT bit in the event type is set.

This event is issued with GC disabled. GC is re-enabled after NotifyEvent returns.

```
struct {
    char *thread_name;
    char *group_name;
    char *parent_name;
    jobjectID thread_id;
    JNIEnv *thread_env_id;
} thread_start;
Contents:
    thread_name    - name of thread being started.
    group_name     - group to which the thread belongs.
    parent_name    - name of parent.
    thread_id      - thread object ID.
    thread_env_id  - JNIEnv * of the thread.
```

Threads are associated with a JNIEnv pointer and a thread object ID. The JVMPI uses the JNIEnv pointer as the thread ID.

4. Dump Formats 4.1 Sizes and Types Used in Dump Format Descriptions

```
u1: 1 byte
u2: 2 bytes
u4: 4 bytes
u8: 8 bytes
ty: u1 where:
    JVMPI_NORMAL_OBJECT    normal object
    JVMPI_CLASS            array of objects
    JVMPI_BOOLEAN          array of booleans
    JVMPI_BYTE             array of bytes
    JVMPI_CHAR             array of chars
    JVMPI_SHORT            array of shorts
```

-continued

| | |
|---|---|
| JVMPI_INT | array of ints |
| JVMPI_LONG | array of longs |
| JVMPI_FLOAT | array of floats |
| JVMPI_DOUBLE | array of doubles | vl: values, exact size depends on the type of value:

| | |
|---|---|
| boolean, byte | u1 |
| short, char | u2 |
| int, float | u4 |
| long, double | u8 |

JNIEnv *, jobjectID, and JVMPI_RawMonitor sizeof (void *)

4.2 Heap Dump Format

The heap dump format depends on the level of information requested

JVMPI_DUMP_LEVEL_0:

The dump consists of a sequence of records of the following format:

| | |
|---|---|
| ty | type of object |
| jobjectID | object |

JVMPI_DUMP_LEVEL_1:

The dump format is the same as that of JVMPI_DUMP_LEVEL_2, except that the following values are excluded from the dump: primitive fields in object instance dumps, primitive static fields in class dumps, and primitive array elements.

JVMPI_DUMP_LEVEL_2:

The dump consists of a sequence of records, where each record includes an 8-bit record type followed by data whose format is specific to each record type.

| Record type | | Record data |
|---|---|---|
| JVMPI_GC_ROOT_UNKNOWN (unknown root) | jobjectID | object |
| JVMPI_GC_ROOT_JNI_GLOBAL (JNI global ref root) | jobjectID | object |
| | jobject | JNI global reference |
| JVMPI_GC_ROOT_JNI_LOCAL (JNI local ref) | jobjectID | object |
| | JNIEnv * | thread |
| | u4 | frame # in stack trace (−1 for empty) |
| JVMPI_GC_ROOT_JAVA_FRAME (Java stack frame) | jobjectID | object |
| | JNIEnv * | thread |
| | u4 | frame # in stack trace (−1 for empty) |
| JVMPI_GC_ROOT_NATIVE_STACK (native stack) | jobjectID | object |
| | JNIEnv * | thread |
| JVMPI_GC_ROOT_STICKY_CLASS (system class) | jobjectID | class object |
| JVMPI_GC_ROOT_THREAD_BLOCK (reference from thread block) | jobjectID | thread object |
| | JNIEnv * | thread |
| JVMPI_GC_ROOT_MONITOR_USED (entered monitor) | jobjectID | object |
| JVMPI_GC_CLASS_DUMP (dump of a class object) | jobjectID | class |
| | jobjectID | super |
| | jobjectID | class loader |
| | jobjectID | signers |
| | jobjectID | protection domain |
| | void * | reserved |
| | void * | reserved |
| | u4 | instance size (in bytes) |
| | [jobjectID] * | interfaces |
| | u2 | size of constant pool |
| | [u2, ty, vl] * | constant pool index, type, value |
| | [vl] * | static field values |
| JVMPI_GC_INSTANCE_DUMP (dump of a normal object) | jobjectID | object |
| | jobjectID | class |
| | u4 | number of bytes that follow |
| | [vl] * | instance field values (class, followed by super, super's super ...) |
| JVMPI_GC_OBJ_ARRAY_DUMP (dump of an object array) | jobjectID | array object |
| | u4 | number of elements |
| | jobjectID | element class ID (may be NULL in JDK 1.2) |
| | [jobjectID] * | elements |
| JVMPI_GC_PRIM_ARRAY_DUMP (dump of a primitive array) | jobjectID | array object |
| | u4 | number of elements |
| | ty | element type |
| | [vl] * | elements |

4.3 Object Dump Format

The dump buffer consists of a single record which includes an 8-bit record type, followed by data specific to the record type. The record type can be one of the following:

JVMPI_GC_CLASS_DUMP
JVMPI_GC_INSTANCE_DUMP
JVMPI_GC_OBJ_ARRAY_DUMP
JVMPI_GC_PRIM_ARRAY_DUMP

The format of the data for each record type is the same as described above in the heap dump format section. The level of information is the same as JVMPI_DUMP_LEVEL_2, with all of the following values included: primitive fields in object instance dumps, primitive static fields in class dumps, and primitive arrays elements.

4.4 Monitor Dump Format

The dump buffer consists of a sequence of records, where each record includes an 8-bit record type followed by data whose format is specific to each record type.

| Record type | | Record data |
|---|---|---|
| JVMPI_MONITOR_JAVA (Java monitor) | jobjectID | object ID |
| | JNIEnv * | owner thread |
| | u4 | entry count |
| | u4 | number of threads waiting to enter |
| | [JNIEnv *]* | threads waiting to enter |
| | u4 | number of threads waiting to be notified |
| | [JNIEnv *]* | threads waiting to be notified |
| JVMPI_MONITOR_RAW (Raw monitor) | char * | raw monitor name |
| | JVMPI_RawMonitor | raw monitor ID |
| | JNIEnv * | owner thread |
| | u4 | entry count |
| | u4 | number of threads waiting to enter |
| | [JNIEnv *]* | threads waiting to enter |
| | u4 | number of threads waiting to be notified |
| | [JNIEnv *]* | threads waiting to be notified |

5. Data Types

Characters are encoded using the UTF-8 encoding as documented in the Java virtual machine specification.

jobjectID

An opaque pointer representing an object ID.

```
struct_jobjectID;
typedef struct_jobjectID * jobjectID;
```

JVMPI_CallFrame

A method being executed.

```
typedef struct {
    jint lineno;
    jmethodID method_id;
} JVMPI_CallFrame;
Fields:
    line number  - line number in the source file.
    method_id    - method being executed.
```

JVMPI_CallTrace

A call trace of method execution.

```
typedef struct {
    JNIEnv *env_id;
    jint num_frames;
    JVMPI_CallFrame *frames;
} JVMPI_CallTrace;
Fields:
    env_id      - ID of thread which executed this trace.
    num_frames  - number of frames in the trace.
    frames      - the JVMPI_CallFrames that make up this trace. Callee
                  followed by callers.
```

JVMPI_Field

A field defined in a class.

```
typedef struct {
    char *field_name;
    char *field_signature;
} JVMPI_Field;
Fields:
    field_name      - name of field
    field_signature - signature of field
```

JVMPI_HeapDumpArg

Additional info for requesting heap dumps.

```
typedef struct {
    jint heap_dump_level;
} JVMPI_HeapDumpArg;
Fields:
    heap_dump_level - level of heap dump information, values can be:
                      JVMPI_DUMP_LEVEL_0
                      JVMPI_DUMP_LEVEL_1
                      JVMPI_DUMP_LEVEL_2
```

JVMPI_Lineno

A mapping between source line number and offset from the beginning of a compiled method.

```
typedef struct {
    jint offset;
    jint lineno;
} JVMPI_Lineno;
Fields:
    offset - offset from beginning of method
    lineno - lineno from beginning of source file
```

JVMPI_Method

A method defined in a class.

```
typedef struct {
    char *method_name;
    char *method_signature;
    jint start_lineno;
    jint end_lineno;
    jmethodID method_id;
} JVMPI_Method;
Fields:
    method_name      - name of method
    method_signature - signature of method
    start_lineno     - start line number in the source file
    end_lineno       - end line number in the source file
    method_id        - ID given to this method
```

JVMPI_RawMonitor

An opaque pointer representing a raw monitor.

```
struct _JVMPI_RawMonitor;
typedef struct _JVMPI_RawMonitor * JVMPI_RawMonitor;
```

6. Notes on JDK1.2 Implementation Limitations
JVMPI_EVENT_OBJECT_ALLOC events for object arrays are issued with unknown element class IDs (i.e., the class_id field is always NULL).
On Win32 the following events are not yet supported in the presence of the JIT compiler:
JVMPI_EVENT_METHOD_ENTRY,
JVMPI_EVENT_METHOD_ENTRY2,
JVMPI_EVENT_METHOD_EXIT,
JVMPI_EVENT_COMPILED_METHOD_LOAD, and
JVMPI_EVENT_COMPILED_METHOD_UNLOAD,
SuspendThread must be called with the GC is disabled. GC must remain disabled until all threads have been resumed.
The thread start event for the main thread (first thread the VM creates) may arrive after some other events that refer to its JNIEnv interface pointer.
JVMPI_EVENT_ARENA_NEW and JVMPI_EVENT_ARENA_DELETE events are never issued. Arena IDs in other events are always set to 1.

What is claimed is:

1. A system, comprising:
a processor;
memory; and
a virtual machine;
wherein the processor and the memory are configured to facilitate providing a virtual machine profiler interface that communicates information regarding activities of a garbage collector, and a profiler that reports the activities;
wherein the virtual machine creates a plurality of arenas within a heap to facilitate garbage collection;
wherein the profiler comprises a profiler agent for providing at least one of a request for specific types of events and information or an enablement notification of specific types of events and information; and
wherein at least one event is used to dynamically manage garbage collection in the heap, wherein said at least one event is independent of any algorithm for dynamically managing garbage collection in the heap, thereby supporting any implemented garbage collection methods.

2. A system according to claim 1, further comprising a virtual machine, wherein the virtual machine receives, via the virtual machine profiler interface, at least one of the request or the enablement notification.

3. A system according to claim 1, wherein the profiler reports on activities of a Mark-and-Sweep garbage collector.

4. A system according to claim 1, wherein the profiler reports on activities of a Mark-Sweep-Compact garbage collector.

5. A system according to claim 1, wherein the profiler reports on activities of a Two-Space-Copying garbage collector.

6. A system according to claim 1, wherein the profiler reports on activities of a Generational garbage collector.

7. A system according to claim 1, wherein the profiler reports on activities of a Reference-Counting garbage collector.

8. A system according to claim 1, wherein the virtual machine profiler interface accommodates two or more profilers.

9. A method, comprising:
communicating, via a virtual machine profiler interface, information regarding activities of a garbage collector;
reporting the activities using a profiler which comprises a profiler agent;
facilitating the virtual machine profiler interface and profiler with a processor and a memory;
creating, with a virtual machine, a plurality of arenas within a heap to facilitate garbage collection;
providing, using the profiler agent, at least one of a request for specific types of events and information or an enablement notification of specific types of events and information; and
dynamically managing garbage collection in the heap using at least one event, wherein said at least one event is independent of any algorithm for dynamically managing garbage collection in the heap, thereby supporting any implemented garbage collection methods.

10. A method according to claim 9, further comprising receiving at least one of the request or the enablement notification.

11. A method according to claim 9, further comprising reporting activities of a Mark-and-Sweep garbage collector.

12. A method according to claim 9, further comprising reporting activities of a Mark-Sweep-Compact garbage collector.

13. A method according to claim 9, further comprising reporting activities of a Two-Space-Copying garbage collector.

14. A method according to claim 9, further comprising reporting activities of a Generational garbage collector.

15. A method according to claim 9, further comprising reporting activities of a Reference-Counting garbage collector.

16. A computer-readable storage device, comprising instructions for one or more processors to:
- communicate, via a virtual machine profiler interface, information regarding activities of a garbage collector;
- report the activities using a profiler comprising a profiler agent;
- create, with a virtual machine, a plurality of arenas within a heap to facilitate garbage collection;
- provide, using the profiler agent, at least one of a request for specific types of events and information or an enablement notification of specific types of events and information; and
- dynamically manage garbage collection in the heap using at least one event, wherein said at least one event is independent of any algorithm for dynamically managing garbage collection in the heap, thereby supporting any implemented garbage collection methods.

* * * * *